Patented July 19, 1949

2,476,688

UNITED STATES PATENT OFFICE 2,476,688

VULCANIZATION ACCELERATORS

Lyndon B. Tewksbury, Jr., Potsdam, N. Y., assignor to United States Rubber Company, New York, N. Y., a corporation of New Jersey No Drawing. Application December 18, 1946, Serial No. 717,085

4 Claims. (Cl. 260—306.6)

This invention relates to a new class of chemicals valuable as accelerators for the vulcanization of rubber or other vulcanizable rubber-like substances.

An object of the invention is to provide a new class of accelerators for the vulcanization of natural or synthetic rubber. Another object is to provide accelerators having thermal stability and storage stability, and providing safety from scorch in rubber. Other objects will be apparent from the hereinafter description.

The new accelerators subscribe to the formula

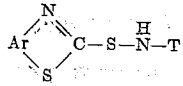

where Ar is an ortho-arylene nucleus, and T represents a thiolanyl group

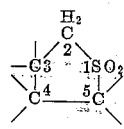

the dangling short valences of which are satisfied by hydrogen, and hydrocarbon, corresponding to the appropriate diene hydrocarbon from which the thiolanyl group is derived by reaction with sulfur dioxide. The chemicals are generally termed benzothiazole N-1,1-dioxo 3-thiolanyl sulfenamides, of which the most prominent and preferred member is benzothiazole N-1,1-dioxo 3-thiolanyl sulfenamide, considered to have the formula

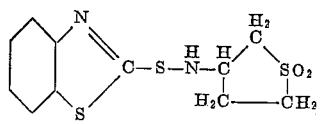

The selected diene is first condensed with sulfur dioxide to form the corresponding 1,1-dioxo thiolene-3. This is illustrated for butadiene-1,3 and sulfur dioxide by the equation

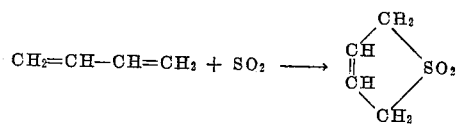

(1,1-dioxo-thiolene-3 or butadiene sulfone).

In place of butadiene-1,3, there may be used substituted-butadienes-1,3 such as isoprene, piperylene, 2,3-dimethyl butadiene-1,3, 1,3-dimethyl butadiene-1,3, 1-phenyl butadiene-1,3.

The 1,3-diene sulfone is then condensed with ammonia, as shown in British Patent No. 489,974, and U. S. Patent No. 2,291,798 (Example 6), by heating the sulfone with 3 to 4 molar excess of anhydrous liquid ammonia at 65° C. for 28 hours in a steel bomb. The primary amine thus produced may be then reacted with a selected o-arylene thiazyl 2-sulfenamide, as shown in U. S. Patent No. 2,382,793. The present sulfenamide accelerators may also be prepared from the selected primary thiolanyl amine and the selected mercaptothiazole, or alkali-metal salt thereof, by the well-known oxidative condensations used in preparing sulfenamides.

Exemplary of further examples of the present accelerator chemicals, among others are the following: benzothiazole N-1,1-dioxo 3-thiolanyl sulfenamide, benzothiazole N-1,1-dioxo 4-methyl 3-thiolanyl sulfenamide (derived from isoprene), benzothiazole N-1,1-dioxo 3,4-dimethyl 3-thiolanyl sulfenamide (derived from 2,3-dimethyl butadiene-1,3), a mixture of benzothiazole N-1,1-dioxo 2 and 5 methyl 3-thiolanyl 2-sulfenamide (from piperylene), and 6-methyl benzothiazole N-1,1-dioxo 3-thiolanyl 2-sulfenamide.

The following examples, in which the parts are by weight, further illustrate the invention:

Example 1.—Preparation 2-benzothiazole sulfenamide (10 g.–0.55 mol) is mixed with 30 g. 1,1-dioxo 3-amino thiolane and the mixture warmed 5 hours at 40–50° C. Ammonia is freely evolved at first, but during the last half hour of reaction, little or no ammonia is observed. A very viscous oil resulted, in which there is some suspended matter. On adding a mixture of water and ordinary ether, a solid separates which is filtered, washed and recrystallized from 50 cc. boiling alcohol (ethanol). A yield of 9.5 g. pure benzothiazole N-1,1-dioxo 3-thiolanyl sulfenamide melting 113–115° C. is obtained.

| Analysis | Found | Theory for $C_{11}H_{12}O_2N_2S_3$ |
|---|---|---|
| Nitrogen | 7.82 | 9.3 |
| Sulfur | 32.9 | 32.0 |

Example 2.—Acceleration Tests

A rubber compound of the following recipe is cured and tensiled in the usual manner:

| | |
|---|---|
| Butadiene-styrene copolymer rubber (GRS) | 100 |
| Tar | 5 |
| Zinc oxide | 5 |
| Carbon black | 50 |
| Sulfur | 2 |
| Benzothiazole N-1,1-dioxo 3-thiolanyl sulfenamide | 1.5 |
| | 163.5 |

Cured 45 and 60 minutes at 45 pounds per square inch steam pressure; T is tensile in pounds per square inch and E is elongation:

| Cure | T | E |
|---|---|---|
| 45'/45 | 700 | 300 |
| | 1,820 | 500 |
| | 2,700 | −670 (Break) |
| 60'/45 | 1,100 | 300 |
| | 2,600 | 500 |
| | 2,900 | 515 (Break) |

Scorch Tests

Scorch tests were run at 10 pounds per square inch steam for 60, 120, 150 and 240 minutes:

| Cure | T | E |
|---|---|---|
| 60/10 | 83 | 506 |
| 120/10 | 83 | 496 |
| 150/10 | 86 | 506 |
| 240/10 | 1,010 | 825 |

The accelerators may be used to accelerate the vulcanization of any of the natural or synthetic rubbers which ordinarily lend themselves to cure with sulfur or other curing agent susceptible to acceleration, and which includes the Buna type rubbers (rubbery polymers essentially derived from butadiene-1,3) such as GRS (rubbery copolymer of butadiene-1,3 and styrene), GRA (rubbery copolymer of butadiene-1,3 and acrylonitrile), GRM (polychloroprene), polyisoprene, poly-butadiene-1,3, etc., and latices of such rubbers and the rubbers laid down from such latices.

The present accelerators may be used in the same proportion in the rubber, as is used with other conventional accelerators in the vulcanization of the various rubbers. They also may be used alone or in conjunction with conventional accelerator activators such as diphenyl guanidine, etc., or with such as mercapto-benzothiazole.

Other ratios of the compounding ingredients than those given in Example 2, as well as other desired fillers, pigments, softeners, antioxidants, and the like, may be employed in the production of various types of rubber compounds, as will be apparent to those skilled in the art of vulcanization of rubber.

While I have shown and described various embodiments of the invention, it is to be understood that the invention is susceptible to other modifications which appear within the spirit of the invention and the scope of the appended claims.

Having thus described my invention, what I claim and desire to protect by Letters Patent is:

1. A compound of the formula

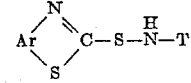

where Ar is an ortho-arylene nucleus and T is a 1,1-dioxo 3-thiolanyl group.

2. A compound of the formula

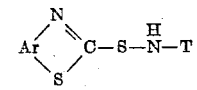

where Ar is an ortho-benzene nucleus and T is a 1,1-dioxo 3-thiolanyl group.

3. A benzothiazole N-1,1-dioxo 3-thiolanyl sulfenamide.

4. Benzothiazole N-1,1-dioxo 3-thiolanyl sulfenamide.

LYNDON B. TEWKSBURY, Jr.

REFERENCES CITED

The following references are of record in the file of this patent:

UNITED STATES PATENTS

| Number | Name | Date |
|---|---|---|
| 2,219,006 | Delfs | Oct. 22, 1940 |
| 2,231,353 | Watt | Feb. 11, 1941 |
| 2,273,323 | Jones | Feb. 17, 1942 |
| 2,382,793 | Howland | Aug. 14, 1945 |